United States Patent
Davis

(10) Patent No.: US 10,913,887 B2
(45) Date of Patent: Feb. 9, 2021

(54) WEAR INHIBITOR FOR OIL AND GAS PRODUCTION

(71) Applicant: Multi-Chem Group, LLC, San Angelo, TX (US)

(72) Inventor: Nathan Darrell Davis, Conroe, TX (US)

(73) Assignee: Multi-Chem Group, LLC, Houston, TX (US)

( * ) Notice: Subject to any disclaimer, the term of this patent is extended or adjusted under 35 U.S.C. 154(b) by 243 days.

(21) Appl. No.: 15/973,194

(22) Filed: May 7, 2018

(65) Prior Publication Data

US 2019/0338180 A1    Nov. 7, 2019

(51) Int. Cl.
*E21B 41/02* (2006.01)
*C09K 8/54* (2006.01)
*E21B 43/12* (2006.01)

(52) U.S. Cl.
CPC ............... *C09K 8/54* (2013.01); *E21B 41/02* (2013.01); *C09K 2208/32* (2013.01); *C09K 2208/34* (2013.01); *E21B 43/122* (2013.01); *E21B 43/126* (2013.01); *E21B 43/128* (2013.01)

(58) Field of Classification Search
None
See application file for complete search history.

(56) References Cited

U.S. PATENT DOCUMENTS

| | | | |
|---|---|---|---|
| 4,166,796 A | 9/1979 | Recchuite | |
| 4,339,349 A * | 7/1982 | Martin | C09K 8/54 507/238 |
| 4,517,100 A * | 5/1985 | Nance | C09K 8/04 507/103 |
| 4,913,239 A * | 4/1990 | Bayh, III | E21B 17/003 166/105 |
| 4,917,190 A * | 4/1990 | Coppedge | E21B 33/08 166/113 |
| 5,027,901 A * | 7/1991 | French | C09K 8/54 166/310 |
| 5,700,767 A | 12/1997 | Adams | |
| 6,173,768 B1 | 1/2001 | Watson | |
| 2005/0020455 A1 | 1/2005 | Mapp | |

(Continued)

*Primary Examiner* — Andrew Sue-Ako
(74) *Attorney, Agent, or Firm* — Tenley Krueger; C. Tumey Law Group PLLC

(57) ABSTRACT

A method for inhibiting erosion (wear)-corrosion of downhole components in a secondary lift system, the method comprising: introducing a corrosion inhibitor and a lubricating agent into a wellbore; allowing the corrosion inhibitor and the lubricating agent to mix with a produced fluid to form a mixture; and recovering the mixture from the wellbore through a production tubing, wherein the corrosion inhibitor and/or the lubricating agent contact one or more of the downhole components of the secondary lift system. A system for inhibiting wear in secondary recovery comprising: a casing disposed in a producing wellbore; a production tubing extending into the casing; a downhole equipment disposed in the production tubing, wherein the downhole equipment comprises at least one equipment selected from the group consisting of a sucker rod, a plunger, and an electrical submersible pump; a treatment fluid for introduction into an annulus disposed between the casing and the production tubing.

20 Claims, 4 Drawing Sheets

(56) References Cited

U.S. PATENT DOCUMENTS

| | | | |
|---|---|---|---|
| 2011/0073319 A1* | 3/2011 | Wilson | E21B 43/127 166/372 |
| 2011/0220348 A1 | 9/2011 | Jin et al. | |
| 2013/0217602 A1 | 8/2013 | Otto et al. | |
| 2015/0007995 A1 | 1/2015 | Livescu et al. | |
| 2016/0002521 A1* | 1/2016 | Dillon | C09K 8/06 507/101 |
| 2017/0167483 A1 | 6/2017 | Kool et al. | |

* cited by examiner

WEAR INHIBITOR FOR OIL AND GAS PRODUCTION

BACKGROUND

Many oil and gas production wells are eventually transitioned over to secondary lift techniques as their production rates decline. That is, their bottom hole pressures are no longer high enough to efficiently drive the produced fluids out of the wellbore. Secondary lift techniques may include installation of pumping equipment into the wellbore to increase pressure and/or lift fluids out of the wellbore. Suitable pumping equipment may include sucker rod/pump lift system, plunger lift system, and electrical submersible pump system, among others. However, such pumping equipment may be susceptible to wear after extended periods of operation. For instance, deviations from vertical in the wellbore may create alignment issues between the rods and tubing or plungers and tubing that may cause metal-on-metal wear (erosion) and higher sustained corrosion rates. The erosion-corrosion failure mechanism may be severe enough to reduce run times to about 1-6 months, which leads to increased workover costs and lost production. Unconventional wells, which transition from a vertical to horizontal wellbore may be particularly susceptible to an erosion-corrosion failure mechanism when secondary lift techniques are in use.

A number of different methods have been used to mitigate erosion-corrosion failures in production wells. For example, the methods may include use of rod guides, coating systems, liners, metallurgical changes, and adjusting the depth of the pump anchor or plunger spring. Some of these methods (e.g., coating systems, liners) may require a significant financial investment and extended lead time. Metallurgical changes, such as using boronized tubing, will also increase costs and may transfer the failure from the tubing to the rods. This may be cheaper with respect to replacement costs (rods versus tubing) but does not necessarily reduce the failure rates and lost production costs. Rod guides may typically be the first mitigation strategy; however, these non-metallic inserts may wear down quickly and require replacement, may contribute to increased $CO_2$ and $H_2S$ corrosion, and increase the cost of rods by 20% or more.

BRIEF DESCRIPTION OF THE DRAWINGS

These drawings illustrate certain aspects of some of the present disclosure, and should not be used to limit or define the disclosure.

DETAILED DESCRIPTION

Figure 1:
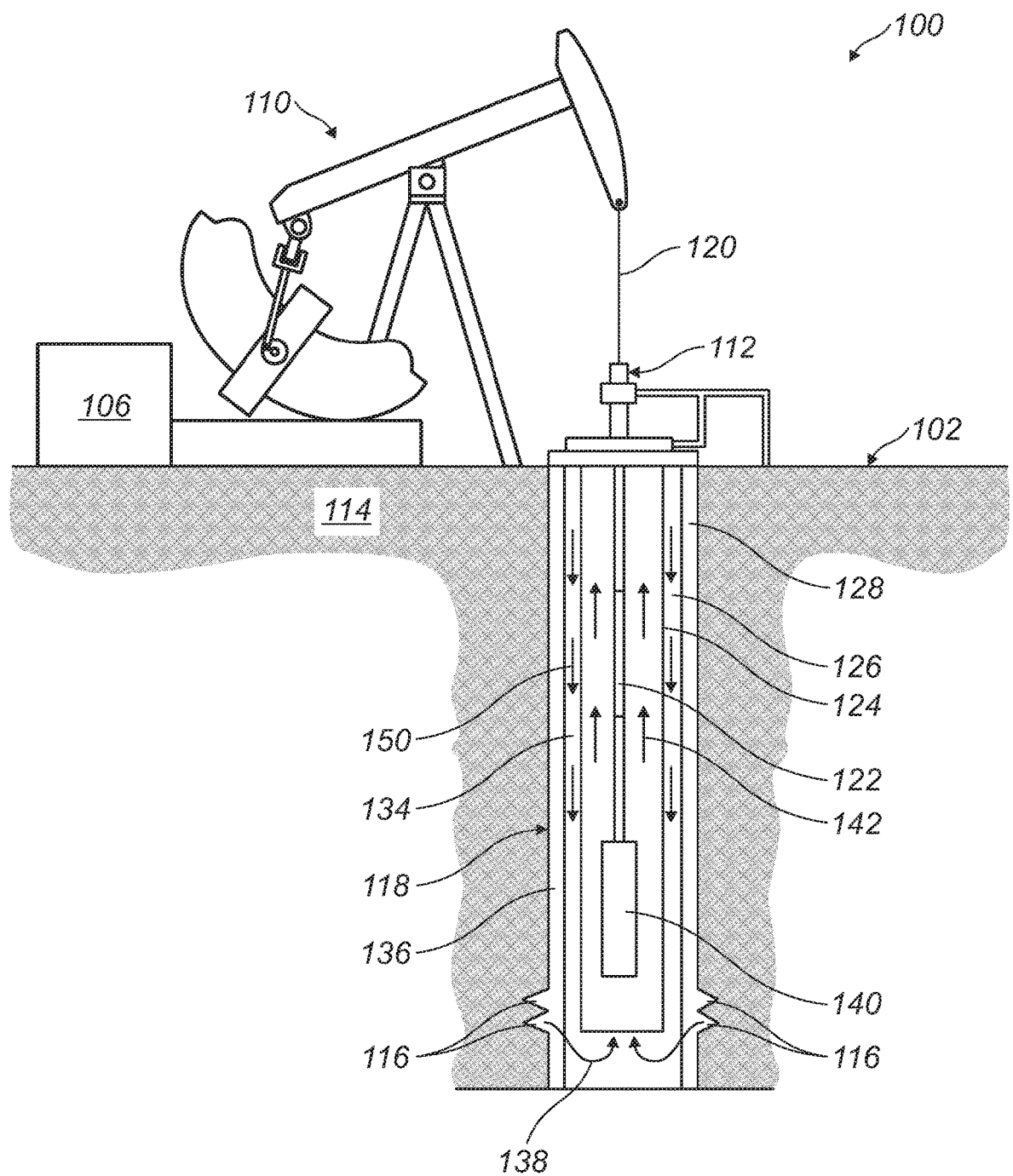
FIG. 1 is a schematic illustration of example secondary lift system including a treatment fluid.

The present disclosure is directed to oil and gas production wells, and, at least in part, to using treatment fluids to mitigate and/or inhibit erosion (wear)-corrosion of downhole components in a secondary lift system. The treatment fluids may include a combination of materials to provide wear resistance to downhole components of secondary lift systems installed in production wells. In particular, the treatment fluids may be introduced into the wellbore such that these added materials can provide wear resistance for downhole components of each system without the use of any other techniques. Unlike alternative techniques that address wear, the technique disclosed herein does not require significant capital investment, work over costs, metallurgical changes or a large lead time. In addition, cost savings may also be realized as the proposed technique may also reduce workover costs and production downtime, allowing production to be maximized.

The treatment fluid may include a base fluid, a corrosion inhibitor, and a lubricating agent. The treatment fluid may have any suitable densities, including a density of about 6 pounds per gallon or greater. Suitable treatment fluids may have a density at a point ranging from about 6 pounds per gallon to about 11 pounds per gallon, or from about 6 pounds per gallon to about 10.5 pounds per gallon, or about 6.5 pounds per gallon to about 8.5 pounds per gallon. One of ordinary skill in the art, with the benefit of this disclosure, should be able to select an appropriate density for the treatment fluid.

Examples of suitable base fluids may include a solvent. Optionally, more than one solvent may be used. The solvent may aid in dissolution of the corrosion inhibitor and/or the lubricating agent. Any suitable solvent for dissolving the corrosion inhibitor and/or the lubricating agent may be used. Suitable solvents may include, but are not limited to, water and/or organic solvents, such as alcohols (e.g., methanol, ethanol, isopropyl alcohol), diesel, kerosene, mineral spirits, xylene, toluene, aromatic naphthas, glycol ethers (e.g., ethylene glycol monobutyl ether), and crude oil, among others. Suitable amounts of the solvent may include, but are not limited to, an amount ranging from about 20 vol. % to about 95 vol. % based on the total volume of the treatment fluid, or from about 50 vol. % to about 80 vol. % based on the total volume of the treatment fluid. One of ordinary skill in the art with the benefit of this disclosure should be able to select an appropriate solvent and amount for a particular application.

Generally, the base fluid may be present in the treatment fluid in an amount ranging from about 10 vol. % to about 99 vol. % based on the total volume of the treatment fluid. For example, the base fluid may be present in the treatment fluid in an amount ranging from about 70 vol. % to about 99 vol. % based on the total volume of the treatment fluid. In specific examples, the base fluid may be present in an amount ranging between any of and/or including any of about 10% vol. %, about 20 vol. %, about 30 vol. %, about 40 vol. %, about 50 vol. %, about 60 vol. %, about 70 vol. %, about 80 vol. %, about 90 vol. %, about 95 vol. %, or about 99 vol. % based on the total volume of the treatment fluid. One of ordinary skill in the art with the benefit of this disclosure should be able to select an appropriate base fluid and concentration thereof for a particular application.

The treatment fluid may further include a corrosion inhibitor. As used herein, the term "corrosion inhibitor"

refers to be any compound capable of inhibiting the corrosion rate of a metal or a metal alloy. As used herein, the term "inhibit" and its derivatives refer to lessening the tendency of a phenomenon to occur and/or the degree to which that phenomenon occurs. The term "inhibit" does not imply any particular degree or amount of inhibition. Any suitable corrosion inhibitor may be used. Suitable corrosion inhibitors may include, but are not limited to, an imidazoline, an amido-amine, a phosphate ester, and/or any combination thereof.

Imidazolines are one example of a compound that may be used as a corrosion inhibitor in the treatment fluids. Imidazolines are a class of heterocycles that may be derived from imidazoles by the reduction of one of the two double bonds. One suitable imidazoline may include a condensation reaction product between polyamines (e.g., diethylene triamine) and tall oil fatty acids. Additional suitable imidazolines may be prepared from diethylene triamine and dimer fatty acids with alkyl chain lengths from 16 carbons to 22 carbons. The imidazolines suitable for use as the corrosion inhibitor may include pure imidazoline as well as imidazoline derivatives, such as quaternized imidazolines, ethoxylated imidazolines, and bis-imidazolines, among others. The imidazoline functional group may be salted with an acid (or not) to improve water dispersibility.

Amidoamines are another example of a compound that may be used as a corrosion inhibitor in the treatment fluids. Amidoamines are a class of chemical compounds that may be formed from fatty acids, esters, or triglycerides with polyamines. Suitable polyamines may include, but are not limited to, ethylene diamines, diethylene triamine, and aminoethylethanolamine, among others. One suitable amidoamine may be formed from imidazolines, such as by hydrolysis of the imidazoline or by increasing the molar ratio of the tall oil fatty acids to the polyamine. Suitable amidoamines may often be provided as mixtures with imidazolines. The amidoamines suitable for use as the corrosion inhibitor may include pure amidoamine as well as amidoamine derivatives, such as quaternized amidoamine and oxyalkalated derivatives.

Phosphate esters are another example of a compound that may be used as a corrosion inhibitor in the treatment fluids. Phosphate esters, which also may be referred to as organophosphates, refers to esters that may be derived from an alcohol and a phosphorus source, such as phosphoric acid. Phosphate esters may include a phosphate group bonded to a carbon. Suitable phosphate esters may be ethoxylated nonyl phenol reaction products with phosphorous pentoxide. Alternatively, polyphosphates may also be used in the reaction. Depending on the phosphorus source, dimers and polymers may also form. One suitable phosphate ester may be characterized by the following formula (1)

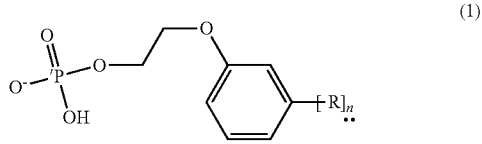

(1)

wherein n is an integer from 5 to 15 and R is a carbon chain with a length of about 2 carbons to about 20 carbons. The carbon chain may be linear or branched. In an embodiment, the carbon chain may be ethoxylated, for example, with about 3 mol % to about 20 mol % of ethylene oxide.

The above description provides three non-limiting examples of suitable corrosion inhibitors. It should be understood that other functional groups may also be suitable for use as the corrosion inhibitor, whether alone or in combination with one or more additional corrosion inhibitors described herein. Suitable functional groups may include, but are not limited to, benzyl or alkyl quaternary amines with carbon distributions of about 8 to 20 carbon units, pyridines, pyridine quaternary ammonium, dimer carboxylic acids, trimer carboxylic acids, mercaptans, bis-quaternary ammonium, and/or any combination thereof. These functional groups may be disposed on a carbon chain backbone. The carbon chain backbone may comprise about 2 carbons to about 18 carbons.

The corrosion inhibitor may be present in the treatment fluid in any suitable amount. Suitable amounts of the corrosion inhibitor may include, but are not limited to, an amount ranging from about 0.5 wt. % to about 80 wt. % based on the total weight of the treatment fluid, or from about 5 wt. % to about 30 wt. % based on the total weight of the treatment fluid. The amount of the corrosion inhibitor used for treatment of the downhole equipment may be based on a concentration of produced water from the wellbore. Accordingly, the corrosion inhibitor may be introduced into the wellbore at a treatment rate ranging from 50 ppm to about 5,000 ppm based on the average volumetric flow rate of produced water. In specific examples, the corrosion inhibitor may be introduced into the wellbore at a treatment rate ranging between any of and/or including any of about 50 ppm, 100 ppm, 200 ppm 300 ppm, about 400 ppm, about 500 ppm, about 1,000 ppm, about 2,000 ppm, about 3,000 ppm, about 4,000 ppm, or about 5,000 ppm based on the average volumetric flow rate of produced water. One of ordinary skill in the art with the benefit of this disclosure should be able to select an appropriate corrosion inhibitor and amount for a particular application.

The treatment fluid may further include a lubricating agent. As used herein, the term "lubricating agent" refers to any substance capable of reducing friction between surfaces in mutual contact. Any suitable lubricating agent may be used, including, but not limited to, sulfurized hydrocarbons. Sulfurized hydrocarbons are hydrocarbons that have been sulfurized by reaction of the hydrocarbon with a sulfur compound, such as a sulfur halide or elemental sulfur. The sulfurized hydrocarbons may also contain dissolved sulfur in the hydrocarbon as well incorporated into the hydrocarbon itself. Suitable sulfurized hydrocarbons may include, but are not limited to, sulfurized olefins, such as a sulfurized olefin including a carboxylic acid, the like, and/or any combination thereof. One suitable sulfurized hydrocarbon may include a sulfurized olefin, such as sulfurized propylene, sulfurized butylene, or sulfurized amylene. Another suitable sulfurized hydrocarbon may include a sulfurized tall oil. Another suitable sulfurized hydrocarbon may include sulfurized tallow oil. Another suitable sulfurized hydrocarbon may include a mixture of a sulfurized tallow oils and vegetable oils. Another suitable sulfurized hydrocarbon may include a mixture of a sulfurized triglyceride and an ethylenically unsaturated hydrocarbon, such as an olefin.

The lubricating agent may be present in the treatment fluid in any suitable amount. Suitable amounts of the lubricating agent may include, but are not limited to, an amount ranging from about 0.5 wt. % to about 80 wt. % based on the total weight of the treatment fluid, or from about 5 wt. % to about 30 wt. % based on the total weight of the treatment fluid. The amount of the lubricating agent may also be selected for treatment of the downhole equipment based on a concentration of produced water from the wellbore. Accordingly, the lubricating agent may be introduced into the wellbore at a treatment rate ranging from about a range of from about be present in the treatment fluid in an amount of about concentration of about 50 ppm to about 5,000 ppm based on the average volumetric flow rate of produced water. In specific examples, the lubricating agent may be introduced into the wellbore at a treatment rate ranging between any of and/or including any of about 50 ppm, 100 ppm, 200 ppm, 300 ppm, about 400 ppm, about 500 ppm, about 1,000 ppm, about 2,000 ppm, about 3,000 ppm, about 4,000 ppm, or about 5,000 ppm based on the average volumetric flow rate of produced water. One of ordinary skill in the art with the benefit of this disclosure should be able to select an appropriate lubricating agent and amount for a particular application.

The corrosion inhibitor and lubricating agent may be introduced into the wellbore at any suitable ratio capable of providing wear resistance to the downhole equipment disposed within the wellbore. Suitable ratios may include but are not limited to, a weight ratio of the corrosion inhibitor to the lubricating agent of about 0.5:10 to about 10:0.5. A more specific ratio that may be suitable is a weight ratio of corrosion inhibitor to lubricating agent may be about 1:3 to about 3:1. Any ratio that falls within the given range may be used. One of ordinary skill in the art with the benefit of this disclosure should be able to select an appropriate weight ratio of the corrosion inhibitor to the lubricating agent for a particular application.

Additionally, a wide variety of optional additives may be included in the treatment fluid as should be appreciated by those of ordinary skill in the art with the benefit of this disclosure. Suitable additives may include, but are not limited to, a surfactant (e.g., foamer, defoamer, wetting agent, and detergent), an oxygen scavenger, emulsion breaker, scale inhibitor, pH adjusters, fluid loss control agents, viscosity increasing agents, weighting agents (other than salt), the like, and/or any combination thereof. Optional additives may be added to the treatment fluid in any suitable amount as desired for a particular application.

The treatment fluid may be used for delivery of the corrosion inhibitor and lubricating agent into the wellbore for treatment of a secondary lift system. By way of example, the corrosion inhibitor and lubricating agent may be introduced into the wellbore and contact downhole equipment to provide protection against material corrosion and wear (erosion). The secondary lift system may be any suitable system capable of lowering the producing bottom hole pressure on the formation to obtain a higher production rate from the well. Suitable secondary lift systems may include, but are not limited to, sucker rod lift system, plunger lift system, electrical submersible pump system, and or the like. In a non-limiting example, in addition to the treatment fluid, a rod guide may be used to help mitigate corrosion and material-on-material erosion.

One type of secondary lift system may include a sucker rod lift system. A sucker rod lift system may include a prime mover, a beam pump, a sucker rod string, a positive displacement pump, and valves. The prime mover may provide sufficient energy to turn a crank arm. The crank arm may be connected to a beam which may cause the beam to reciprocate. The resulting reciprocating movement up and down may lift and lower a rod string that may be attached to one end of the beam. The reciprocating motion of the rod string may open and close valves located in the positive displacement pump downhole. Any suitable valves may be used. Any suitable positive displacement pump may be used. Depending on the position of the valves, a fluid may be captured or allowed to flow into the wellbore. The treatment fluid including the corrosion inhibitor and lubricating agent may mix in the wellbore with produced fluids. The mixture may then enter the positive displacement pump, wherein the treatment fluid and the produced fluids may flow through the positive displacement pump and into the production tubing, also referred to herein as tubing. The treatment fluid may continuously contact the production tubing, the sucker rod string, and the outside of the positive displacement pump, as it leaves the wellbore. This contact may provide erosion-corrosion resistance and/or reduce the wear exhibited on the production tubing, the sucker rod string, and the outside of the positive displacement pump. It should be understood that the above description of the sucker rod lift system is merely exemplary and suitable sucker rod lift system may be otherwise arranged as may be applicable for particular application.

Another type of secondary lift system may include a plunger lift system. Any plunger lift system capable of removing liquids from the wellbore so that the well may be produced at low bottom hole pressures. In an embodiment, the plunger lift system may include downhole and surface equipment. The downhole equipment may include a plunger, a bottom hole bumper spring, and a standing valve. The plunger may include a bypass valve. Optionally, the plunger may be a piston which may include a bypass valve. The plunger or the piston may travel through the production tubing further into the wellbore where it may land on a bottom hole bumper spring. Any suitable plunger capable of moving within the tubing unhindered while creating a mechanical seal between the fluids above and below the plunger when the bypass valve is closed may be used. A tubing anchor may be fixed to the end of the tubing disposed downhole. Any tubing anchor capable of minimizing the movement of the tubing may be used. At the surface, a motor valve assembly may automatically regulate production via a controller. Any suitable controller may be used. A short section of pipe that may extend above the wellhead may serve to catch the plunger after the plunger or piston reaches the surface. The corrosion inhibitor and lubricated agent may be introduced at the wellhead, for example, in the treatment fluid, where it may be placed down hole via an annulus between the wellbore casing and the production tubing. The treatment fluid may mix with the produced fluids at the bottom of the wellbore. As the plunger travels through the production tubing, the mixture of treatment fluid and produced fluid may be displaced thereby contacting the production tubing, the plunger, the bottom hole bumper spring, and the tubing stop. The treatment fluid may provide corrosion and material-on-material erosion resistance to said downhole equipment. It should be understood that the above description of the plunger lift system is merely exemplary and suitable plunger lift system may be otherwise arranged as may be applicable for particular application.

Another type of secondary lift system may include an electrical submersible pump system. Any suitable electrical submersible pump system and or configuration may be used. An electrical submersible pump system may include a multistage centrifugal pump. In an embodiment, the stages may be stacked. Each stage may include a rotating impeller and a stationary diffuser. Any suitable rotating impeller and stationary diffuser may be used. Produced fluid may mix with the treatment fluid in the wellbore. The mixture may flow into the first stage and pass through an impeller. The mixture may then be centrifuged radially outward thereby gaining energy in the form of velocity. The centrifugal pump may be driven by any suitable motor. In an embodiment, the centrifugal pump may be driven by an induction motor. The mixture may then pass through the impeller and enter the diffuser. Any suitable diffuser may be used. The mixture may pass through several stages similar to this one, resulting in a higher pressure after each step. The centrifugal pump may be powered by any suitable motor. In an embodiment, the centrifugal pump may be powered by a downhole submersible motor such as, but not limiting to, an electric motor. Located between the pump intake and the motor may be a seal section that mitigates the axial thrust produced by the pump. The power may be supplied to the motor downhole via a specially constructed electric cable that runs from the surface down to the motor. A controller may be located above the surface to maintain a proper flow of electricity to the pump motor. Any suitable controller may be used. In an embodiment, a treatment fluid may be injected into the system via the wellhead. The treatment fluid may flow through an annulus to the bottom of the wellbore where it may then mix with the produced fluids. The mixture may then flow through each stage of the centrifugal pump thereby providing corrosion and material-on-material erosion resistance to each component it is in contact with. It should be understood that the above description of the electrical submersible pump system is merely exemplary and suitable electrical submersible pump system may be otherwise arranged as may be applicable for particular application.

Any suitable technique may be used for introduction of the corrosion inhibitor and lubricating agent into the wellbore. As previously described, the corrosion inhibitor and lubricating agent may be included in a treatment fluid, which may introduced into the wellbore. The treatment fluid may be introduced to the wellbore with a secondary lift system in any suitable manner. The treatment fluid may be introduced into the wellbore. The treatment fluid may be introduced into the wellbore at any suitable location. In an embodiment, the treatment fluid may be introduced into the wellbore by way of neat annulus drip, a slip stream, a capillary string, or batch treatments. The neat annulus drip technique may include introduction of the treatment fluid into the wellbore at the wellhead in the annulus between the production tubing and production casing. The treatment fluid may then fall (or drip) to the bottom of the wellbore and be produced back up through the production tubing where it may contact downhole equipment. The slip stream technique may include application of the treatment fluid into a slip stream of produced fluids that may be introduced into the annulus between the production tubing and production casing. The treatment fluid may then fall (or drip) to the bottom of the wellbore and be produced back up through the production tubing where it may contact downhole equipment. A valve may be used in the regulation the volume of the treatment fluid delivered into the slip stream. The capillary stream technique may include introduction of the treatment fluid into the wellbore through a capillary tube that extends down the annulus to the bottom of the wellbore. The capillary tube may be a small diameter tube, for example, about ¼ inches (0.6 cm) to about ⅜ inches (0.95 cm) in outer diameter. The batch technique may include pumping a large volume of the treatment fluid into the annulus. A pump truck or other suitable pump may be used to displace the treatment fluid to the bottom of the wellbore. By introducing a large volume, residual concentrations of the lubricating agent and corrosion inhibitor should continue to provide wear resistance even after treatment. In an embodiment, the treatment fluid may be mixed before injection. In an embodiment, the treatment fluid may be mixed downhole after injection.

The treatment fluid may be introduced into the wellbore at any suitable rate, including but not limited to, at a treatment rate ranging from 100 ppm to about 10,000 ppm based on the average volumetric flow rate of produced water. In specific examples, the corrosion inhibitor may be introduced into the wellbore at a treatment rate ranging between any of and/or including any of 100 ppm, 200 ppm 300 ppm, about 400 ppm, about 500 ppm, about 1,000 ppm, about 2,000 ppm, about 3,000 ppm, about 4,000 ppm, about 5,000 ppm, or about 10,000 ppm based on the average volumetric flow rate of produced water. One of ordinary skill in the art with the benefit of this disclosure should be able to select an appropriate corrosion inhibitor and amount for a particular application.

In certain examples, the corrosion inhibitor and lubricating agent may be continuously introduced into the wellbore. Continuous application may be used in any suitable treatment technique, including, but not limited to, neat annulus drip, slip stream, or capillary string, among others. In contrast to batch treatments, continuous introduction may include continuation application of the corrosion inhibitor and lubrication agent, for example, by way of the treatment fluid into the wellbore, for extended period of time, for example, for about 1 day, about 1 week, about 1 month, about 6 months, about 1 year, or even longer.

Produced water from the production wells treated by the corrosion inhibitor and lubricating agent may be recovered and tested to evaluate efficacy of the treatment. For example, lubricity testing of the produced water may show a reduction in the coefficient of friction of more than 20% for the produced water tested after initiation of the treatment as compared to testing of the produced water prior to the treatment. In some examples, the coefficient of friction may be reduced by an amount ranging from 20% to about 80%. As used herein and unless otherwise specified, the lubricity testing of the produced water are block-on-ring tests performed with a FANN® Model 212 EP/Lubricity tester in accordance with ASTM G77-05: Standard Test Method for Ranking Resistance of Materials to Sliding Wear Using Block-on-Ring Wear Test, wherein the ring is made from a hardened 4000 series steel and the block is made from AISI 8620 steel, and wherein the ring rotation rate is 60 rpm with an applied force of 150 inch-pounds (166 meter-kilograms) of force applied between the block and ring.

Accordingly, this disclosure describes systems, compositions, and methods that may use the treatment fluids to provide corrosion-erosion resistance for downhole equipment utilized in secondary lift systems. Without limitation, the systems, compositions, and methods may include any of the following statements:

Statement 1: A method for inhibiting erosion (wear)-corrosion of downhole components in a secondary lift system, the method comprising: introducing a corrosion inhibitor and a lubricating agent into a wellbore; allowing the corrosion inhibitor and the lubricating agent to mix with a produced fluid to form a mixture in the wellbore; and recovering the mixture from the wellbore through a production tubing, wherein the corrosion inhibitor and/or the lubricating agent contact one or more of the downhole components of the secondary lift system to inhibit wear.

Statement 2: The method of statement 1, wherein the corrosion inhibitor and the lubricating agent are continuously introduced into the wellbore for a period of about 1 day or longer.

Statement 3: The method of statement 1 or 2, wherein the step of introducing the corrosion inhibitor and the lubricating agent into the wellbore comprising introducing a treatment fluid comprising a base fluid, the corrosion inhibitor, and the lubricating agent into the wellbore.

Statement 4: The method of any of one of statements 1 to 3, wherein the base fluid comprises at least one solvent selected from the group consisting of an organic solvent, water, and combinations thereof.

Statement 5: The method of any one of statements 1 to 4, wherein the step of introducing the corrosion inhibitor and the lubricating agent into the wellbore comprises dripping at least the corrosion inhibitor and the lubricating agent into an annulus between the production tubing and a casing.

Statement 6: The method of any of one of statements 1 to 5, wherein the secondary lift system comprises at least one system selected from the group consisting of a sucker rod lift system, a plunger lift system, and an electrical submersible pump.

Statement 7: The method of any of one of statements 1 to 6, wherein the one or more downhole components contacted by the corrosion inhibitor and the lubricating agent comprises at least one of a sucker rod or a plunger.

Statement 8: The method of any of one of statements 1 to 7, wherein the corrosion inhibitor and the lubricating agent are each individually introduced into the wellbore at a concentration of in a range of about 50 ppm to about 5000 ppm based on an average volumetric flow rate of water produced from the wellbore.

Statement 9: The method of any of one of statements 1 to 8, wherein the corrosion inhibitor and the lubricating agent are introduced at a corrosion inhibitor to lubricating weight ratio of about 0.5:10 to about 10:0.5.

Statement 10: The method of any of one of statements 1 to 9, wherein the produced fluid comprises produced water, wherein the corrosion inhibitor and the lubricating agent reduces a coefficient of friction for the produced water by an amount ranging from 20% to about 80% as determined from lubricity testing of the produced water with block-on-ring tests.

Statement 11: The method of any of one of statements 1 to 10, wherein the corrosion inhibitor comprises at least one compound selected from the group consisting of an imidazoline, an amidoamine, a phosphate ester, and combinations thereof.

Statement 12: The method of any of one of statements 1 to 11, wherein the lubricating agent comprises a sulfurized hydrocarbon.

Statement 13: The method of any of one of statements 1 to 12, wherein the corrosion inhibitor comprises an imidazoline and a phosphate ester, and wherein the lubricating agent comprises a sulfurized olefin.

Statement 14: A method for inhibiting wear of downhole components in a secondary lift system, the method comprising: introducing a treatment fluid into a wellbore in an annulus between a production tubing and a casing, wherein the treatment fluid comprises a solvent, a corrosion inhibitor, and a lubricating agent, wherein the lubricating agent comprises a sulfurized hydrocarbon; allowing the treatment fluid to mix with a produced fluid in the wellbore to produce a mixture; and recovering the mixture through the production tubing, wherein the corrosion inhibitor and/or the lubricating agent contact at least one of a sucker rod or a plunger to inhibit wear.

Statement 15: The method of statement 14, wherein the corrosion inhibitor comprises at least one compound selected from the group consisting of an imidazoline, an amidoamine, a phosphate ester and combinations thereof.

Statement 16: The method of statement 14 or 15, wherein the treatment fluid is introduced continuously into the wellbore for a period of about 1 week or longer, wherein the corrosion inhibitor and the lubricating agent are each individually introduced into the wellbore at a concentration of in a range of about 50 ppm to about 2000 ppm based on an average volumetric flow rate of water produced from the wellbore, wherein the corrosion inhibitor comprises an imidazoline and a phosphate ester, and wherein the sulfurized hydrocarbon comprises a sulfurized olefin, wherein the organic solvent is present in the treatment fluid in an amount ranging from about 20 vol. % to about 95 vol. % based on the total volume of the treatment fluid.

Statement 17: A system for inhibiting wear in secondary recovery comprising: a casing disposed in a producing wellbore; a production tubing extending into the casing; a downhole equipment disposed in the production tubing, wherein the downhole equipment comprises at least one equipment selected from the group consisting of a sucker rod, a plunger, and an electrical submersible pump; and a treatment fluid for introduction into an annulus disposed between the casing and the production tubing, wherein the treatment fluid comprises a base fluid, a corrosion inhibitor, and a lubricating agent.

Statement 18: The system of statement 17, wherein the base fluid comprises a solvent, wherein the solvent is selected from the group consisting of an organic solvent, water, and combination thereof.

Statement 19: The system of statement 17 or 18, wherein the corrosion inhibitor and the lubricating agent are present a corrosion inhibitor to lubricating weight ratio of about 0.5:10 to about 10:0.5.

Statement 20: The system of any of the preceding statements, wherein the corrosion inhibitor comprises at least one compound selected from the group consisting of an imidazoline, an amidoamine, a phosphate ester, and combinations thereof, and wherein the lubricating agent comprises a sulfurized hydrocarbon.

Example methods of using the treatment fluid for introduction of the corrosion inhibitor and lubricating agent will now be described in more detail with reference to FIG. 1. Any of the previous examples of treatment fluid may apply in the context of FIG. 1.

FIG. 1 illustrates secondary lift system 100. Secondary lift system 100 may include any suitable secondary lift system 100 capable of lowering the producing bottom hole pressure on subterranean formation 114 to obtain a higher production rate from wellbore 118. As illustrated, secondary lift system 100 may be a rod pump system. Secondary lift system may include equipment at surface 102 and disposed within subterranean formation 114. Equipment at surface 102 may include, but is not limited to, prime mover 106, pumping unit 110, wellhead 112, and rod string 120. Prime mover 106 may be any unit capable of providing sufficient energy to pumping unit 110. In an embodiment, prime mover 106 may be an internal combustion engine, an electrical motor, or the like. Pumping unit 110 may be any pumping unit capable of converting rotational motion created by prime mover 106 into a reciprocating vertical motion. The reciprocating vertical motion may lift and lower rod string 120 within wellbore 132. Rod string 120 may include a plurality of sucker rods 122 connected in sequence and disposed within production tubing 124. Sucker rods 122 may be of any suitable length, diameter, and material. Disposed below the plurality of sucker rods 122, near the producing zone and perforations 116, may be downhole pump 140. Perforations 116 may allow the produced fluid to flow into and out of the subterranean formation 114. Downhole pump 140 may be actuated by reciprocating vertical motion of rod string 120.

In an embodiment, the vertical motion of sucker rods 122 may scrape against production tubing 124. Overtime, this repetitive scraping may cause production tubing 124 and sucker rods 122 to wear. In order to reduce or mitigate the wear of production tubing 124 and sucker rods 122, a treatment fluid 150 may be introduced into wellbore 118. As illustrated, treatment fluid 150 may introduced into annulus 134 between production tubing 124 and casing 136. As previously described, treatment fluid 150 may include a base fluid, a corrosion inhibitor, and lubricating agent. Treatment fluid 150 may be introduced into wellbore 132 in any suitable manner. In an embodiment, treatment fluid 150 may be injected into wellbore 118 at wellhead 112. In an embodiment, treatment fluid 150 may be continuously provided to wellbore 118. Suitable techniques for introduction of treatment fluid 150 may include, but are not limited to, neat annulus drip, slip stream, capillary string, or batch treatments. As illustrated, treatment fluid 150 may be introduced to wellbore at wellhead 112 by way of neat annulus drip. Treatment fluid may flow through wellhead 112 and into annulus 134 formed between production tubing 124 and casing 136. Treatment fluid 150 may fall and/or drip to the bottom of wellbore 118. At the bottom of wellbore 132, treatment fluid 150 may mix with the produced fluids 138. The mixture 142 of treatment fluid 150 and produced fluids 138 may then be pumped through downhole pump 140 and up production tubing 124. As the mixture 142 of treatment fluid 150 and the produced fluids 138 flow through secondary lift system 100, the lubricating agent and corrosion inhibitor in the treatment fluid 150 and the produced fluids may continuously be in contact with production tubing 124, sucker rods 122, and downhole pump 140, in turn which may provide production tubing 124, sucker rods 122, and downhole pump 140 with corrosion and metal-on-metal erosion resistance. This provided resistance may reduce the wear on said components of secondary lift system 100 and in turn extend their production life.

The exemplary treatment fluid particulates disclosed herein may directly or indirectly affect one or more components or pieces of equipment associated with the preparation, delivery, recapture, recycling, reuse, and/or disposal of the treatment fluid particulates. For example, the treatment fluid particulates may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the sealant composition. The treatment fluid particulates may also directly or indirectly affect any transport or delivery equipment used to convey the treatment fluid particulates to a well site or downhole such as, for example, any transport vessels, conduits, pipelines, trucks, tubulars, and/or pipes used to compositionally move the treatment fluid particulates from one location to another, any pumps, compressors, or motors (e.g., topside or downhole) used to drive the treatment fluid particulates into motion, any valves or related joints used to regulate the pressure or flow rate of the treatment fluid particulates (or fluids containing the same treatment fluid particulates), and any sensors (i.e., pressure and temperature), gauges, and/or combinations thereof, and the like. The disclosed treatment fluid particulates may also directly or indirectly affect the various downhole equipment and tools that may come into contact with the treatment fluid particulates such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems and methods are given. In no way should the following examples be read to limit, or define, the entire scope of the disclosure.

Example 1

Block-on-ring wear tests were run to determine whether or not certain compounds in a treatment fluid would provide lubricity to equipment in a secondary lift system. The tests were performed in sea water brine with a solvent (i.e. toluene) and a corrosion inhibitor or a corrosion inhibitor plus lubricating agent. The corrosion inhibitor and lubricating agent used in each test are provided in Table 1 below:

TABLE 1

| | Corrosion Inhibitor | | Lubricating Agent | |
|---|---|---|---|---|
| Sample | Type | Amount (ppmv) | Type | Amount (ppmv) |
| Test 1 (control) | — | — | — | — |
| Test 2 | Imidazoline/phosphate ester/benzyl quat | 23/9/19 | None | |
| Test 3 | Imidazoline/phosphate ester/benzyl quat/pyridine quat | 26/15/ 30/35 | None | |
| Test 4 | Cocamidopropyl hydroxysultaine | 56 | None | |
| Test 5 | Imidazoline/phosphate ester/ethoxylated tallow amine | 60/15/30 | Sulfurized hydrocarbons | 38 |
| Test 6 | Ethylene Glycol Monobutyl Ether (solvent) | 750 | None | |
| Test 7 | Imidazoline/phosphate ester/benzyl quat | 12/5/10 | None | |
| Test 8 | Pyridine/pyridine quat/bis-imidazoline/bis-quat/phosphate ester/ethoyxlated tallow amine | 11/3/9/ 2/7/3 | None | |
| Test 9 | Phosphate ester/pyridine quat/benzyl quat | 4/8/6 | None | |

Figure 2:
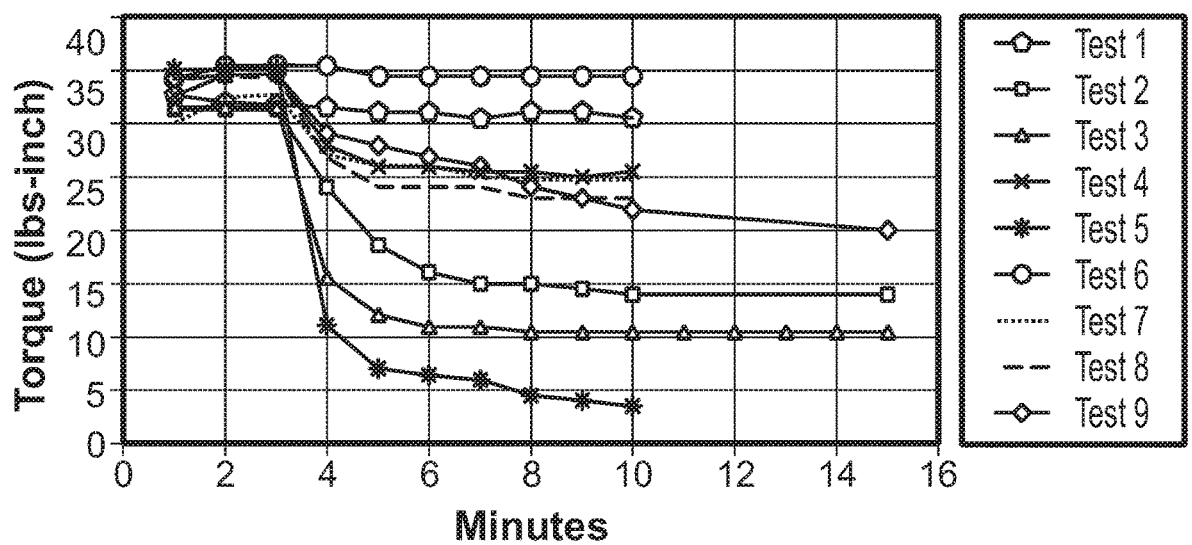
FIG. 2 is a graph showing the results of block-on-ring lubricity tests for various corrosion inhibitors formulations and a formulation containing lubricating agents.

The results of the testing are provided in FIG. 2. The block-on-ring wear tests performed in accordance with ASTM G77-05: Standard Test Method for Ranking Resistance of Materials to Sliding Wear Using Block-on-Ring Wear Test. The block-on-ring wear test was performed with a FANN® Model 212 EP/Lubricity tester. The ring was made from a hardened 4000 series steel; the block was made from AISI 8620 steel. The block-on-ring-wear test was performed with an applied force of 166 meter-kilograms and a rotation rate of 60 rpm.

Example 2

Figure 3:
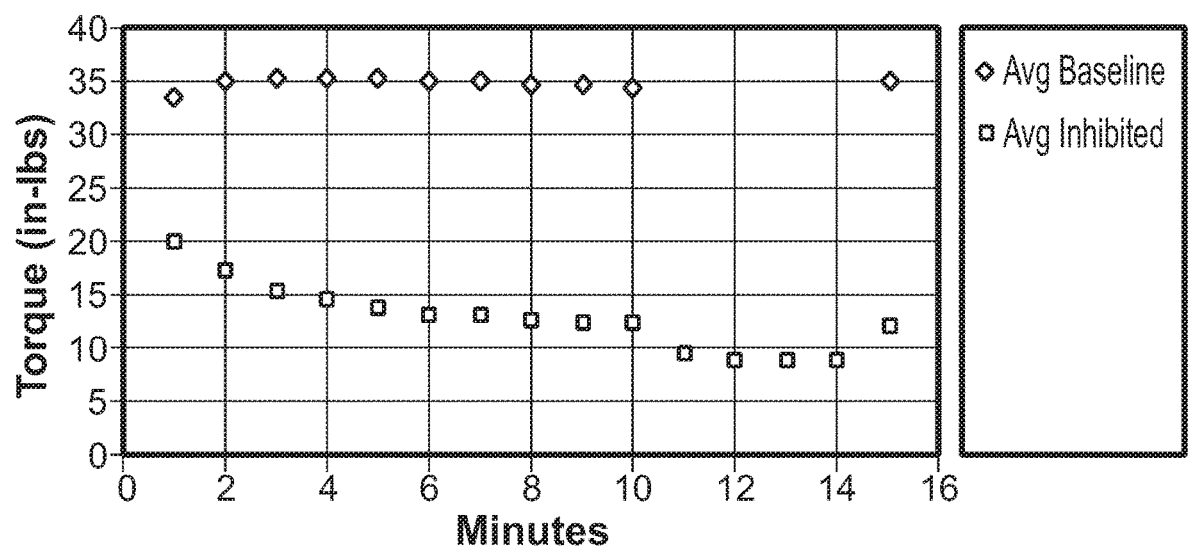
FIG. 3 is a graph showing the results of block-on-ring lubricity tests for produced water from a production well treated with a corrosion inhibitor and lubricating agent.

To further test wear resistance, the imidazoline, phosphate ester, ethoxylated tallow amine, and sulfurized hydrocarbons from Test 5 in Example 1 were introduced into a production well at a rate of 105 ppm corrosion inhibitor and 38 ppm lubricating agent based on the volumetric flow rate of produced water. The ratio of corrosion inhibitors was the same as Test 5 from Example 1. Monthly samples of produced water were collected from the wellhead of the production well and sent to a laboratory for block-on-ring wear tests. The block-on-ring wear tests were performed as described above in Example 1. After treatment with the imidazoline, phosphate ester, ethoxylated tallow amine, and sulfurized hydrocarbons, a 70% decrease in torque required to sustain rotation at 60 rpm was observed. This is equivalent to a 70% reduction in the coefficient of friction. The results of these tests are provided in FIG. 3. On FIG. 3, the results after treatment are indicated as average inhibited based on 7 monthly samples.

Example 3

Figure 4:
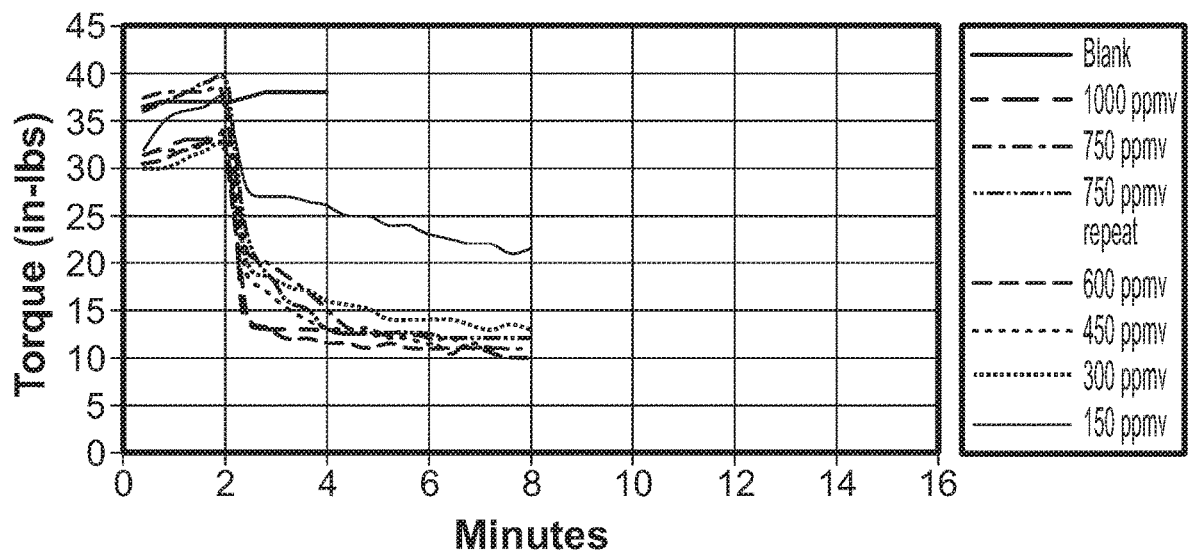
FIG. 4 is a graph showing the results of block-on-ring lubricity tests for various concentrations of corrosion inhibitor and lubricating agent.

In this example, additional block-on-ring tests were performed with a FANN® Model 212 EP/Lubricity tester in accordance with ASTM G77-05: Standard Test Method for Ranking Resistance of Materials to Sliding Wear Using Block-on-Ring Wear Test. The ring was made from a hardened 4000 series steel; the block was made from AISI 8620 steel. The testing was performed using 350 ml of a synthetic field brine (107 g/L Total Dissolved Solids (TDS)). The synthetic field brine had a composition of 932 ppmv of calcium, 40,085 ppmv of sodium, 473 ppmv of magnesium, 180 ppmv of barium, 7 ppmv of sulfate, 488 ppmv of bicarbonate, 65,000 ppmv of chlorine, 177 ppmv of potassium, and 232 ppmv of strontium. The ring rotation rate was set at 60 rpm and 150 inch-pounds of force (166 meter-kilograms) was applied between the block and ring. This equates to roughly 600 psi based on the size of the contact pad between the block and ring. A solvent (i.e. toluene) including the imidazoline, phosphate ester, ethoxylated tallow amine and sulfurized hydrocarbons from Test 5 in Example 1 was injected into the brine at the 5 minute mark at concentrations between 150 to 1,000 ppmv. The solvent included 14% by volume of the corrosion inhibitor (imidazoline, phosphate ester, ethoxylated tallow amine) and 5% by volume of the lubricating agent (sulfurized hydrocarbon). The change in fluid lubricity was measured until a relatively stable torque value was reached. The test resulted in an average inhibited torque value at 20 minutes of about 11.5 inch-pounds of force (12.74 meter-kilograms). The average torque required was reduced by about 67% on average, equating to an approximate reduction in friction coefficient of 67%. The results of these tests are provided in FIG. 4.

Example 4

Figure 5:
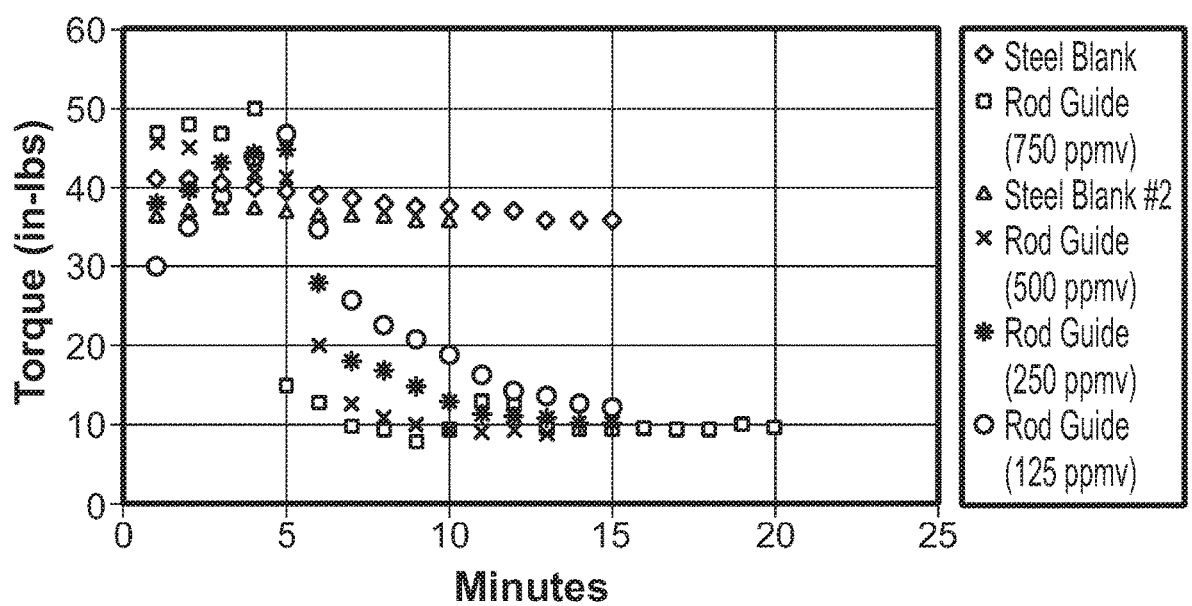
FIG. 5 is a graph showing the results of block-on-ring lubricity tests of rod guides (non-metallic) for various concentrations of corrosion inhibitor and lubricating agent.

Block-on-ring wear tests were run to determine whether or not certain compounds would provide lubricity to equipment in a secondary lift system. Lubricity testing were performed for rod guides (non-metallic) at different treatment rates. In this example, block-on-ring tests were performed with a FANN® Model 212 EP/Lubricity tester in accordance with ASTM G77-05: Standard Test Method for Ranking Resistance of Materials to Sliding Wear Using Block-on-Ring Wear Test. The ring was made from a hardened 4000 series steel; the block was made from polyphthalamide (PPA). The testing was performed using 350 ml of a synthetic seawater. The ring rotation rate was set at 60 rpm and 150 inch-pounds (166 meter-kilograms) of force was applied between the block and ring. This equates to roughly 600 psi based on the size of the contact pad between the block and ring. A solvent (i.e. toluene) including the imidazoline, phosphate ester, ethoxylated tallow amine and sulfurized hydrocarbons from Test 5 in Example 1 was injected into the synthetic seawater at the 5 minute mark at concentrations between 125 to 750 ppmv. The solvent included 14% by volume of the corrosion inhibitor (imidazoline, phosphate ester, ethoxylated tallow amine) and 5% by volume of the lubricating agent (sulfurized hydrocarbon). The change in fluid lubricity was measured until a relatively stable torque value was reached. The results of these tests are provided in FIG. 5. Significant reductions in torque were observed after the application of imidazoline, phosphate ester, ethoxylated tallow amine and sulfurized hydrocarbons even at low treatment rates (125 ppmv). The rod guide materials are various types of thermoplastics.

Example 5

Figure 6:
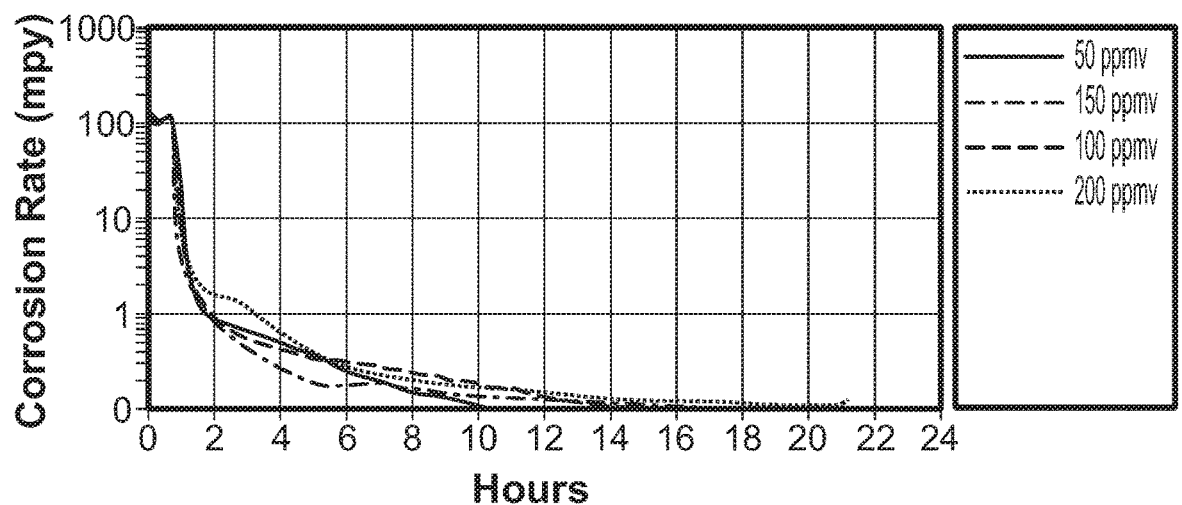
FIG. 6 is a graph showing the results of corrosion inhibition tests for various concentrations of corrosion inhibitor and lubricating agent.

Rotating Electrode Cylinder (RCE) tests were also run to determine corrosion inhibition performance of certain corrosion inhibitors. The RCE test was performed according to ASTM G185-06. The testing was performed using 800 ml of a synthetic field brine (107 g/L Total Dissolved Solids (TDS)) and 80 ml of ultra pure kerosene (low aromatic content) that has a flash point near 93° C. The synthetic field brine had a composition including 932 ppmv of calcium, 40,085 ppmv of sodium, 473 ppmv of magnesium, 180 ppmv of barium, 7 ppmv of sulfate, 488 ppmv of bicarbonate, 65,000 ppmv of chlorine, 177 ppmv of potassium, and 232 ppmv of strontium. All of the tests were continuously purged with anaerobic grade carbon dioxide at 175 ml/min and heated to 65.6° C. The electrode rotation rate was set at 1,900 rpm, which generated a wall shear stress of about 5 Pa. The corrosion inhibitor and lubricating agent were added to the top of the oil phase. The test was run four times by using varying amounts, 50 ppmv, 100 ppmv, 150 ppmv, and 200 ppmv, of a solvent (i.e. toluene) including the imidazoline, phosphate ester, ethoxylated tallow amine and sulfurized hydrocarbons from Test 5 in Example 1. Instantaneous corrosion rate measurements were made with a Gamry electrochemical measurement system using the linear polarization resistance technique (LPR). The scan rate was set to 0.4 mV/sec over 26 mV potential range. The working electrodes used were made from 1018 carbon steel and were polished with 600 grit silicon carbide paper prior to the test. The counter electrodes and the reference electrodes were made from 316L standard steel. It was determined that the average baseline corrosion rate was approximately 114 mpy. The average baseline corrosion rate was less than 1 mpy. The results of the test are provided in FIG. 6.

Example 6

Additional block-on-ring wear tests were run to evaluate whether additional materials would provide lubricity to equipment in a secondary lift system. The tests were performed in synthetic sea water (36 g/L TDS) and 250 ppm by volume of the various corrosion inhibitors. The corrosion inhibitor used in each test are provided in Table 2 below:

TABLE 2

| Sample | Corrosion Inhibitor | |
|---|---|---|
| | Type | Amount (ppmv) |
| Test 10 | Ethoxylate Imidazoline | 250 |
| Test 11 | Imidazoline | 250 |
| Test 12 | Pyridine Quat | 250 |
| Test 13 | Maleated amide | 250 |
| Test 14 | Benzyl Quat | 250 |
| Test 15 | Complex Mixture | 250 |
| Test 16 | Blank | 250 |
| Test 17 | Nonylphenol ethoxylate | 250 |
| Test 18 | Bis-Quat | 250 |
| Test 19 | Phosphate ester | 250 |

Figure 7:
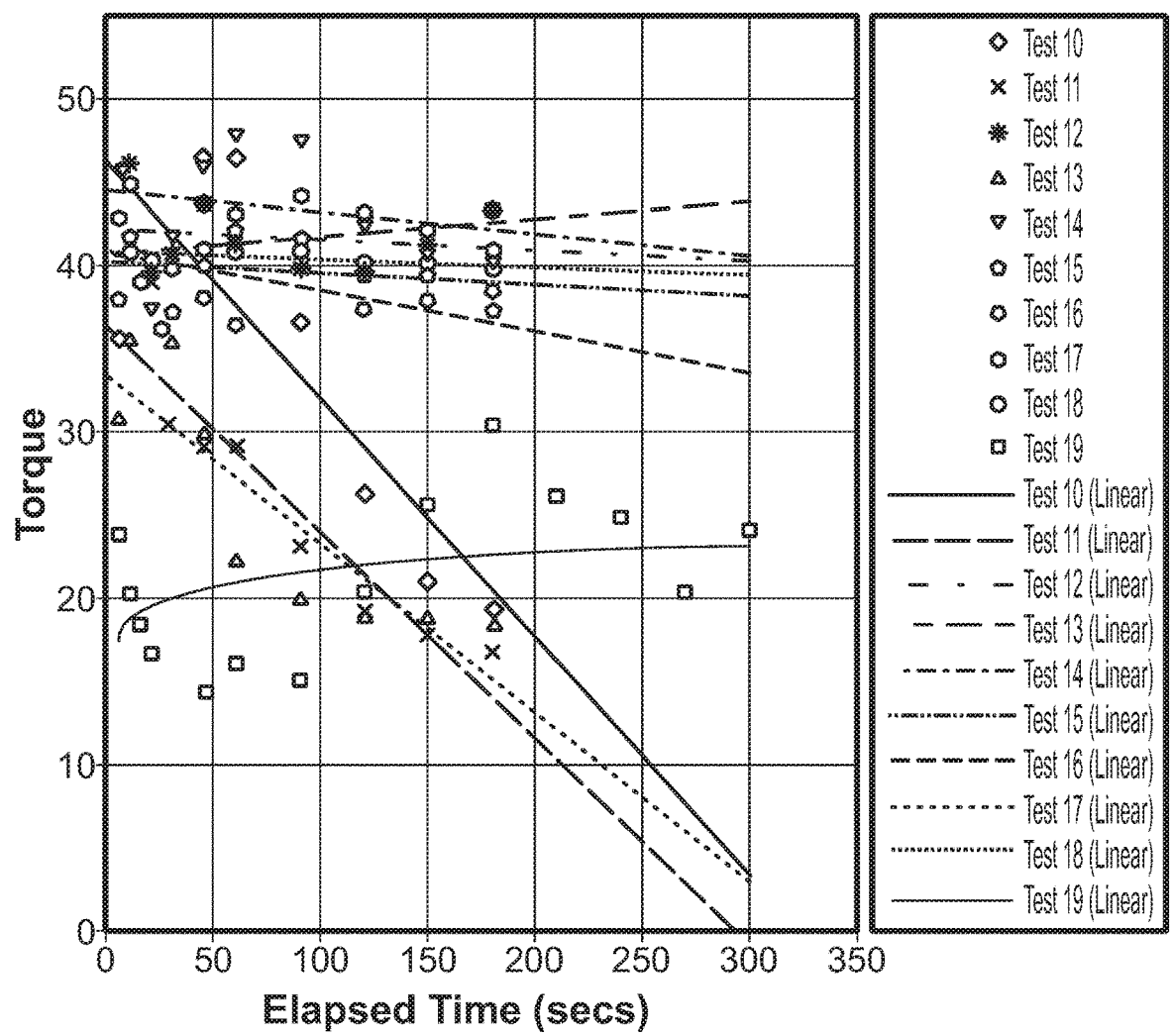
FIG. 7 is a graph showing the results of block-on-ring lubricity tests for various corrosion inhibitor intermediates.

The results of the testing are provided in FIG. 7. The block-on-ring wear tests performed in accordance with ASTM G77-05: Standard Test Method for Ranking Resistance of Materials to Sliding Wear Using Block-on-Ring Wear Test. The block-on-ring wear test was performed with a OFITE Model #112-00 EP/Lubricity tester. The block and ring were both made from heat treated AISI 4140 steel. The block-on-ring-wear test was performed with an applied force of 200 inch-pounds (221 meter-kilograms) between the block and the ring with a ring rotation rate of 300 rpm. The change in fluid lubricity was measured until a relatively stable torque value was reached.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for inhibiting erosion (wear)-corrosion of downhole components in a secondary lift system, the method comprising:
   providing a treatment fluid comprising a corrosion inhibitor and a lubricating agent, wherein a weight ratio of the corrosion inhibitor to the lubricating agent is about 1:3 to about 3:1;
   continuously introducing the treatment fluid comprising the corrosion inhibitor and the lubricating agent into a wellbore for a period of about 1 day or longer, wherein the treatment fluid is introduced into the wellbore at a treatment rate of about 50 ppm to about 1000 ppm based on an average volumetric flow rate of produced water from a production well such that the produced water has reduction in a coefficient of friction of more than 20% due to interaction with the treatment fluid;
   allowing the treatment fluid to mix with a produced fluid to form a mixture in the wellbore prior to entering the secondary lift system through a production tubing; and
   recovering the mixture from the wellbore through the production tubing, wherein the corrosion inhibitor and/or the lubricating agent contact one or more of the downhole components of the secondary lift system to inhibit wear.

2. The method of claim 1, wherein the treatment fluid further comprises a base fluid.

3. The method of claim 2, wherein the base fluid comprises at least one solvent selected from the group consisting of an organic solvent, water, and combinations thereof.

4. The method of claim 3, wherein the solvent is present in an amount ranging from about 20 vol. % to about 95 vol. % based on the total volume of the treatment fluid.

5. The method of claim 2, wherein the corrosion inhibitor is present in an amount ranging from 0.5% to about 80% weight of the treatment fluid.

6. The method of claim 2, wherein the lubricating agent is present in an amount ranging from 0.5% to about 80% weight of the treatment fluid.

7. The method of claim 2, wherein the base fluid is present in the treatment fluid in an amount of about 70 vol. % to about 99 vol. % based on the total volume of the treatment fluid.

8. The method of claim 1, wherein the step of introducing the treatment fluid into the wellbore comprises dripping at least the treatment fluid into an annulus between the production tubing and a casing.

9. The method of claim 1, wherein the secondary lift system comprises at least one system selected from the group consisting of a sucker rod lift system, a plunger lift system, and an electrical submersible pump.

10. The method of claim 1, wherein the one or more downhole components contacted by the corrosion inhibitor and the lubricating agent comprises at least one of a sucker rod or a plunger.

11. The method of claim 1, wherein the produced fluid comprises produced water, wherein the corrosion inhibitor and the lubricating agent reduces a coefficient of friction for the produced water by an amount ranging from 20% to about 80% as determined from lubricity testing of the produced water with block-on-ring tests.

12. The method of claim 1, wherein the corrosion inhibitor comprises at least one compound selected from the group consisting of an imidazoline, an amidoamine, a phosphate ester, and combinations thereof.

13. The method of claim 1, wherein the lubricating agent comprises a sulfurized hydrocarbon.

14. The method of claim 1, wherein the corrosion inhibitor comprises an imidazoline and a phosphate ester, and wherein the lubricating agent comprises a sulfurized olefin.

15. The method of claim 1, wherein the treatment rate is about 100 ppm to about 800 ppm based on an average volumetric flow rate of produced water from a production well.

16. A method for inhibiting wear of downhole components in a secondary lift system, the method comprising:

continuously introducing a treatment fluid into a wellbore in an annulus between a production tubing and a casing, wherein the treatment fluid comprises a solvent, a corrosion inhibitor, and a lubricating agent, wherein the lubricating agent comprises a sulfurized hydrocarbon, wherein a weight ratio of the corrosion inhibitor to the lubricating agent is about 1:3 to about 3:1, and wherein the treatment fluid is introduced into the wellbore at a treatment rate of about 50 ppm to about 1000 ppm based on an average volumetric flow rate of produced water such that the produced water has a reduction in a coefficient of friction of more than 20% due to interaction with the treatment fluid;

allowing the treatment fluid to mix with a produced fluid to form a mixture in the wellbore prior to entering the secondary lift system through the production tubing; and recovering the mixture through the production tubing, wherein the corrosion inhibitor and/or the lubricating agent contact at least one of a sucker rod or a plunger to inhibit wear.

17. The method of claim 16, wherein the corrosion inhibitor comprises at least one compound selected from the group consisting of an imidazoline, an amidoamine, a phosphate ester, and combinations thereof.

18. The method of claim 16, wherein the treatment fluid is introduced continuously into the wellbore for a period of about 1 week or longer, wherein the corrosion inhibitor comprises an imidazoline and a phosphate ester, and wherein the sulfurized hydrocarbon comprises a sulfurized olefin, wherein the solvent is present in the treatment fluid in an amount ranging from about 20 vol. % to about 95 vol. % based on the total volume of the treatment fluid.

19. The method of claim 16, wherein the corrosion inhibitor is present in an amount ranging from about 0.5% to about 80% weight of the treatment fluid.

20. The method of claim 16, wherein the lubricating agent is present in an amount ranging from 0.5% to about 80% weight of the treatment fluid.

* * * * *